United States Patent [19]

Maeda et al.

[11] 4,204,732
[45] May 27, 1980

[54] FOCUS ADJUSTING MECHANISM FOR VARIABLE MAGNIFICATION DEVICE

[75] Inventors: Masahiro Maeda; Hirohumi Kayahara, both of Toyokawa, Japan

[73] Assignee: Minolta Camera Kabushiki Kaisha, Osaka, Japan

[21] Appl. No.: 43,273

[22] Filed: May 29, 1979

[30] Foreign Application Priority Data

Jun. 16, 1978 [JP] Japan .............................. 53-83002[U]

[51] Int. Cl.² ...................... G03B 27/52; G03B 13/28; G03B 13/02
[52] U.S. Cl. ...................................... 355/55; 354/197; 355/45
[58] Field of Search .............. 355/5, 55, 45; 354/197; 353/25, 26, 27

[56] References Cited

U.S. PATENT DOCUMENTS

| | | | |
|---|---|---|---|
| 2,599,327 | 6/1952 | Haeseler | 354/197 |
| 2,720,145 | 10/1955 | Goodfellow | 354/197 |
| 2,741,170 | 4/1956 | Wenke | 354/197 |
| 2,905,069 | 9/1959 | Ayres et al. | 354/197 |
| 3,713,737 | 1/1973 | Suzuki et al. | 355/45 |
| 3,999,847 | 12/1976 | Maeda et al. | 353/27 R |

FOREIGN PATENT DOCUMENTS

| | | | |
|---|---|---|---|
| 51-52252 | 4/1976 | Japan | 355/55 |
| 206115 | 2/1924 | United Kingdom | 354/197 |
| 925189 | 5/1963 | United Kingdom | 354/197 |

*Primary Examiner*—Donald A. Griffin
*Attorney, Agent, or Firm*—Wolder, Gross & Yavner

[57] ABSTRACT

In an optical system including a plurality of projecting lenses mounted on a support plate and selectively usable by moving the support plate for projecting copy images at varying magnifications, a focus adjusting mechanism includes focus adjusting first means shiftable between an operating position and a nonoperating position, second means biasing the focus adjusting means toward the operating position for rendering a projecting lens adjustable by the focus adjusting means when the lens is positioned in the projecting position, and third means for shifting the focus adjusting means to the nonoperating position against the action of the second means to permit changing the lenses.

10 Claims, 5 Drawing Figures

FOCUS ADJUSTING MECHANISM FOR VARIABLE MAGNIFICATION DEVICE

BACKGROUND OF THE INVENTION

The present invention relates to a focus adjusting mechanism for use in a device having variable magnification means, and more particularly to a focus adjusting mechanism for use with variable magnifiction means such as a plurality of projecting lenses of varying focal lengths, and adapted for use in reader-printers and like apparatus.

Microfiche films, one type of microfilms, are used at various reduced scales (microfilming reduction ratios) generally for recording literature, papers and documents. The recorded images carried on microfiche films are viewed or copied with the use of reader-printers which, if equipped with a single projecting lens of definite focal length, will involve a limitation on the size of projectable enlarged images.

Accordingly, conventional reader-printers may be provided with a plurality of projecting lenses of varying focal lengths, one of which will be selectively positioned in an operative position to give the desired magnification in accordance with a particular microfiche film. These lenses, however, require a space for storage, are not easily and quickly changed and must be focused every time the lenses are changed.

To overcome these drawbacks, an apparatus has been proposed and placed into use as disclosed in U.S. Pat. No. 3,713,737. The disclosed apparatus comprises a plurality of projecting lenses having varying focal lengths and a support plate carrying the lenses together and movable to bring the desired projecting lens to a projecting position. With the movement of the support plate, the focusing ring on the selected lens comes into engagement with a single focusing dial fixedly provided in the vicinity of the projecting position so that the lens can be focused by the dial. Although the apparatus has found wide use because of its outstanding usefulness, the apparatus still remains to be improved in respect of the following drawback.

With the apparatus described, the change of the projecting lenses involves disengagement and engagement between the focusing ring of the lens and the focusing dial. This could permit a small amount of rotation of the focusing ring entirely independently of focusing adjustment. This phenomenon will be described below in greater detail. When the focusing ring on a lens moves with the support plate relative to the focusing dial, the ring has not been completely disengaged from the dial means in the initial stage of the relative movement, with the result that this movement entails slight rotation of the ring and the dial means. This phenomenon also takes place when the focusing ring in a disengaged position comes into engagement with the dial means. This gives rise to a serious objection, for example, when a projecting lens, once focused, is shifted to a non-projecting position and thereafter returned to the projecting position again, because each shift of the lens to the non-projecting position and then back to the projecting position causes rotation of the focusing ring on the lens, thereby bringing the lens out of focus and necessitating focus adjustment again.

To overcome the above drawback, Published Unexamined Japanese Utility Model Application No. 51/52252 proposes an expedient in which the objectionable rotation of the focusing ring of the lens is precluded by rendering the focus adjusting dial means less resistant to rotation than the focusing ring. Although the objectionable rotation of the focusing ring can be prevented to some extent according to the proposal, the drawback still remains to be fully eliminated, consequently entailing the frequent necessity of refocusing during use.

For reference, the focus adjustment of projecting lenses for reader-printers will be described specifically with numerical values. The projecting lenses usually used have a magnification of about 10 to about 50X. Thus, even the slightest shift in the focus of the lens will produce blurred enlarged images upon projection. It has been found that the projecting lens, when shifted about 0.02 mm from its focused position, produces blurred images which can be detected with the unaided eye. Calculated as the angular displacement of the focusing ring of the lens, such amount of shift corresponds to as small as about 3 to about 4 deg.

SUMMARY OF THE INVENTION

The main object of the present invention is to provide a novel and useful focus adjusting mechanism for use in devices having variable magnification means.

Another object of this invention is to provide a focus adjusting mechanism which is adapted for use in a device having variable magnification means and which overcomes the foregoing drawbacks of conventional devices.

Another object of this invention is to provide a focus adjusting mechanism for use in devices having variable magnification means such as projecting lenses with focusing rings which are not rotatable except by a focusing action.

Another object of this invention is to provide a focus adjusting mechanism for use in devices with variable magnification means which has a high degree of operability.

Another object of this invention is to provide a focus adjusting mechanism which is particularly suited to microfilm or microfiche readers or microfilm or microfiche reader-printers.

These and other objects of the present invention can be accomplished by providing a focus adjusting mechanism for use with variable magnification means in which the means for focusing the magnification means can be shifted to a nonoperating position relative to a projecting lens before changing the projecting lens.

More specifically, the objects of the invention are accomplished by providing a focus adjusting mechanism which includes a support fixedly carrying a plurality of projecting lenses and movable for selectively bringing one of the projecting lenses to a projecting position, focus adjusting first means shiftable between an operating position and a nonoperating position, second means biasing the focus adjusting means toward the operating position for rendering a projecting lens adjustable by the focus adjusting first means when the lens is positioned in the projecting position, and third means for shifting the focus adjusting means to the nonoperating position against the action of the second means to permit changing the lenses.

The focus adjusting mechanism has further features.

First, the focus adjusting mechanism includes a lever for moving the support. The lever is shiftable relative to the support at least between a first position and a second position.

Second, the third means is connected by coupling means to the lever for moving the support and is movable by the shift of the lever to the second position to shift the focus adjusting means.

Third, the shift of the lever to the second position renders the support movable by the lever.

Fourth, the focus adjusting mechanism includes means for biasing the lever toward the first position.

These and other objects, advantages and features of the invention will become apparent from the following description thereof when read in conjunction with the accompanying drawings which illustrate exemplary embodiments of the invention.

BRIEF DESCRIPTION OF THE DRAWINGS

In the drawings.

In the following description, like parts are designated by like reference numbers throughout the several views of the attached drawings.

DETAILED DESCRIPTION OF THE INVENTION

Embodiments of the focus adjusting mechanism of this invention for variable magnification devices will be described below with reference to the accompanying drawings which show the invention as incorporated in a reader-printer for illustrative purposes.

Figure 1:
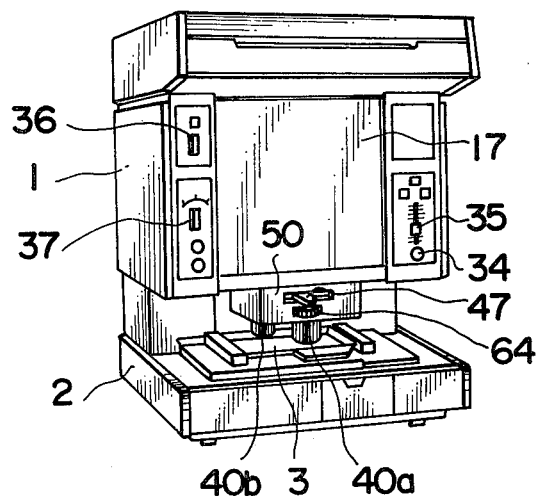
FIG. 1 is a perspective view showing a reader-printer in which a focus adjusting mechanism according to the present invention is used for its variable magnification means.
Figure 2:
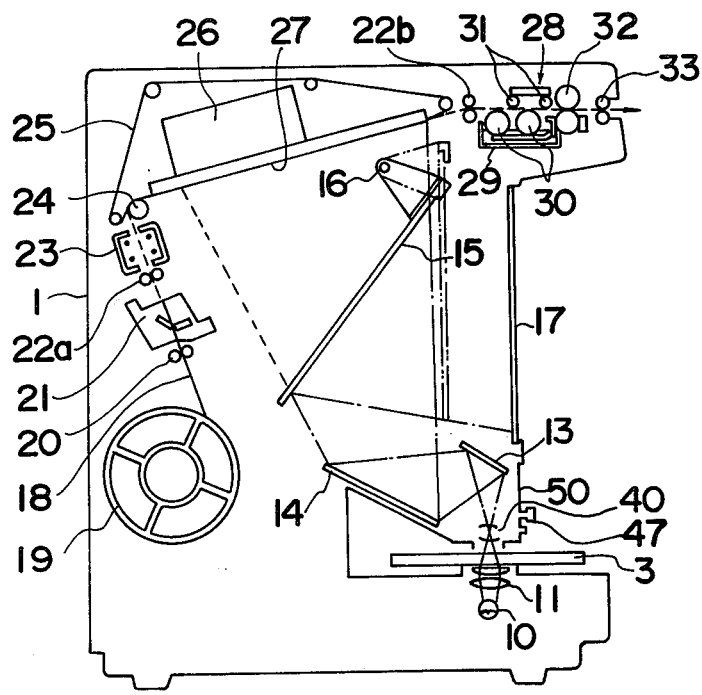
FIG. 2 is a diagram schematically showing the interior construction of the reader-printer illustrated in FIG. 1.

FIGS. 1 and 2 show the reader-printer in its entirety. A microfiche film (not shown) is held in a planar position by a carrier 3 supported on a frame 2 of the main body 1 of the reader-printer. The carrier 3 is movable toward the front or rear and also sidewise. The film is illuminated by a light source 10 through a group of condenser lenses 11. An enlarged image of that portion of the film which is illuminated is projected by a projecting lens 40 and mirrors 13, 14 and 15 onto a screen 17, provided on the front side of the main body 1.

The carrier 3 has upper and lower glass plates (not shown) for holding the microfiche film therebetween. For a copying operation, the mirror 15 is movable about a pivot 16 to the position indicated in two-dot-and-dash lines in FIG. 2.

A roll of photosensitive paper 18 is supported on a spool 19. Arranged along the path of transport of the photosensitive paper are a pair of feed rollers 20, a cutter 21, a pair of transport rollers 22a, a charger 23, a press roller 24, a suction belt 25 and a suction unit 26. The photosensitive paper 18 is exposed at an exposure station 27 provided by the suction belt 25 in a planar form under the action of the suction unit 26. The path of transport of the paper extending from the exposure station 27 is provided with a pair of transport rollers 22b, a developing unit 28, a pair of squeeze rollers 32 and a pair of dehumidifying rollers 33. The developing unit 28 includes a tank 29 filled with a developer, lower electrode rollers 30 partly immersed in the developer and upper electrode rollers 31 disposed above the rollers 30.

Provided on the front side of the main body 1 are copying switch 34, an exposure adjusting knob 35, a copy number setting dial 36, a paper size changing switch 37, and other control elements.

The focus adjusting mechanism of this invention will be described in greater detail with reference to FIG. 3.

Figure 3:
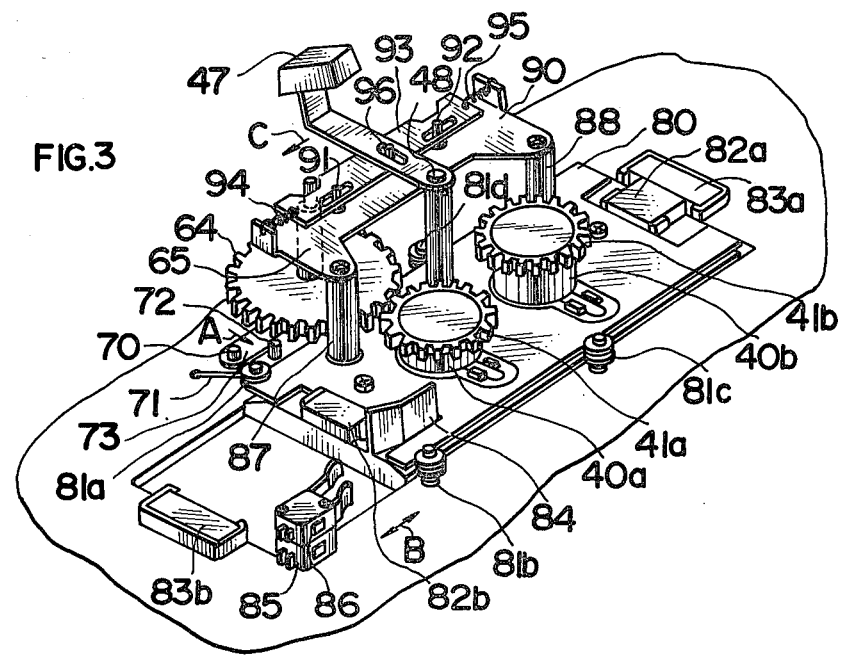
FIG. 3 is an enlarged perspective view showing the focus adjusting mechanism used in the reader-printer.

FIG. 3 shows the interior construction of the projecting lens unit 50 of the reader-printer shown in FIG. 1. The unit 50 includes a projecting lens changing lever 47 and a focusing dial 64, both of which are partially exposed to outside so as to be operable from outside. Unit 50 has two lenses, namely first and second projecting lenses 40a and 40b, having different focal lengths.

The focusing dial 64 is rotatably mounted on a shaft 65 fixed to one end of a lever 73. Lever 73 is pivotably supported by a pivot 70 and is biased by a spring 71 in the direction of an illustrated arrow A into contact at its side edge with a positioning pin 72. FIG. 3 shows the first projecting lens 40a in the projecting position. When the lens 40a is thus positioned, the focusing dial 64 is in its operating position with its outer periphery held in engagement with a focusing ring 41a on the first projecting lens 40a by the force of the spring 71. The focusing dial 64, when operated by rotation, causes rotation of ring 41a to cause focus adjustment of the lens 40a in the projecting position.

The lens changing lever 47 is pivotably mounted on a lever shaft 48 which is fixed to a projecting lens support plate 80. Plate 80 supports the first and second lenses 40a and 40b and is movable in the directions of arrows B by guide rollers 81a, 81b, 81c and 81d rotatably mounted on the main body. The support plate 80 is provided with magnets 82a and 82b at its opposite side ends. When the first lens 40a is in the projecting position, the magnet 82a and a magnetic block 83a fixed to the main body attract each other, holding the support 80 in the illustrated position. When the second lens 40b is in the projecting position, the magnet 82b and a magnetic block 83b will magnetically attract each other. The support plate 80 is provided with a microswitch actuating member 84 which selectively turns on or off microswitches 85 and 86 mounted on the main body. Switches 85 and 86 feed an electric signal to an electric circuit in the reader-printer main body to indicate which of the lenses is in the projecting position. The electric signal can be utilized by the circuit, for example, for adjusting the amount of exposure of the photosensitive paper in accordance with the magnification of the selected lens.

The lens changing lever 47 is associated with an intermediate plate 90 fixed to the support plate 80 by posts 87 and 88. By springs 94 and 95 a link plate 93 is connected to the intermediate plate 90 which is fixedly provided with pins 91 and 92 engaging in slots formed in the link plate 93. Springs 91 and 92 have equal biasing force and act to retain the link plate 93 in the illustrated neutral position. A pin 96 is fixedly provided at the midpoint of link plate 93 and engages in a slot formed in the lens changing lever 47.

The link plate 93 is formed with a cam face on one side thereof in contact with a portion of the dial shaft 65. The cam face is so shaped that only when the link plate 93 is in its neutral position as shown, a recessed portion of the cam face is in contact with a portion of the dial shaft 65, thereby allowing the focusing dial 64 to be in its operating position. When the link plate 93 is brought out of its neutral position, that portion of the dial shaft 65 comes into contact with a projection of the cam face, thereby moving the lever 73 in the direction opposite to the arrow A against the action of the spring 71 and consequently causes the focusing dial 64 to be moved to its nonoperating position.

The operation of the focus adjusting mechanism of this invention will now be described.

First, the second projecting lens 40b in the position shown in FIG. 3 will be shifted to the projecting position in place of the first lens 40a in the following manner. When changing the lens, the operator holds the lens changing lever 47 and moves the lever in the direction of an arrow C shown. In the initial stage of this movement, the lever 47 pivotally moves about the lever pivot 48 slightly since the support plate 80 is held in the illustrated position by the magnetic attraction between the magnet 82a and the magnetic block 83a. The pin 96 causes the link plate 93 to also move in the direction of arrow C, following the lever 47. Although not described, the force of the springs 94 and 95 and the magnetic attraction between the magnets 82a, 82b and the magnetic blocks 83a, 83b are so determined as to permit such a movement.

The movement of the link plate 93 causes the pins 91 and 92 fixed to the intermediate plate 90 to bear against the link plate 93 toward one end of the plate 93. In this state, the lever 47 is held to the support plate 80 against movement relative thereto only in the direction of the arrow C, at the two points of the pivot 48 and the pin 96. Accordingly, when moved further in the direction of the arrow C, the lens changing lever 47 causes the support plate 80 also to follow the movement of the lever 47 in this direction against the magnetic attraction between the magnet 82a and the magnetic block 83a.

Before movement of the support plate 80 occurs, an important action takes place when the link plate 93 starts to follow the lens changing lever 47. When the link plate 93 moves in the direction of the arrow C from its neutral position, the dial shaft 65 in contact with the recessed portion of the cam face of the plate 93 comes into contact with the projection of the cam face, causing the lever 73 to pivot in the direction opposite to arrow A against the action of the spring 71. This moves the focusing dial 64 in the direction opposite to arrow A from its operating position in which it is in engagement with the focusing ring 41a of the first lens 40a, thus bringing the dial 64 to a nonoperating position out of engagement with the ring 41a. This movement is followed by the aforementioned movement of the support plate 80, so that even when the focusing ring 41a moves relative to the focusing dial 64 on the main body for the change of lens, the ring and the dial, which are completely out of engagement with each other, will not affect each other and cause focusing movement of the lens 40a.

As the support plate 80 moves in the direction of the arrow C with the movement of the lens changing lever 47, the dial shaft 65 sliding on the projection of the cam face of the link plate 93 comes into another recessed portion of the cam face closer to the lens 40b, allowing the focusing dial 64 to move in the direction of arrow A. At this time, however, the projecting lens 40b has not reached the projecting position, and the dial 64 will not engage the ring 41b of the lens 40b.

When the support plate 80 further moves in the direction of arrow C, the dial shaft 65 temporarily engaging in the recessed portion of the cam face rides onto another projection of the cam face. The support plate 80 slightly moves in the same direction in this state to bring the second projecting lens 40b to the projecting position, whereupon the actuating member 84 operates the microswitches 85 and 86, which in turn feed to the main body electric circuit an electric signal indicating that the second lens 40b has reached the projecting position. The magnet 82b and the magnetic block 83b now magnetically attract each other and lock the lens 40b to the projecting position. Thus the lens is completely installed in place. On completing the change of lenses, the operator releases the lens changing lever 47 from the hand to free the lever 47 from the force which has been acting thereon in the direction of the arrow C, whereupon the link plate 93 returns in the direction opposite to arrow C to its neutral position under the action of the springs 94 and 95. At this time, the lens changing lever 47 also moves in the same direction by a small amount. As a result, the dial shaft 65 riding on the projection of the cam face of the link plate 93 engages in the recessed portion to shift the focusing dial 64 in the direction of arrow A to the operating position. With the second lens 40b already brought to the projecting position at this time, the focusing dial 64 properly comes into engagement with the focusing ring 41b. Consequently the second lens 40b can be focused by turning the dial 64 from outside.

If the focusing dial 64 is likely to contact the focusing rings 41a, 41b when temporarily shifted to its operating position during the foregoing lens changing movement, means may be provided for preventing the shift of the dial to the operating position while the lenses 40a, 40b are not in the projecting position. More specifically, the intermediate plate 90 may be formed with a cam face adapted for contact with the dial shaft 65 fulfilling the requirements described above.

In order to move lens 40a into the operating position in place of lens 40b, lever 47 will be moved in the direction opposite to arrow C, but the mechanism operates basically in the same manner as described above, so this changing operation will not be described.

As will be apparent from the above description, the mechanism of this invention assures focus adjustment with ease and does not involve the focal movement of the projecting lens due to contact with the focusing means every time the lens is changed, thus eliminating the necessity of readjustment of the lens once it has been focused despite the replacement of the lens.

Another embodiment of the focus adjusting mechanism of this invention will be described below with reference to FIGS. 4 and 5.

Figure 4:
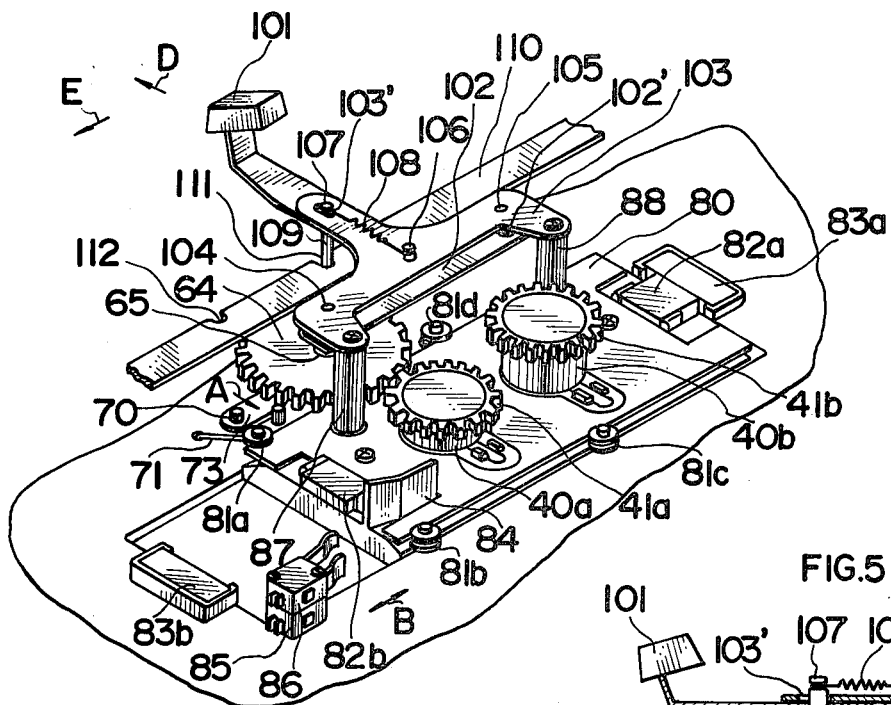
FIG. 4 is a perspective view showing another embodiment of the focus adjusting mechanism according to the present invention and adapted for use with variable magnification means.
Figure 5:
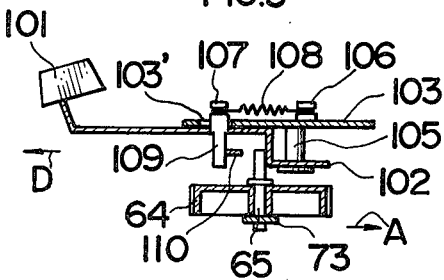
FIG. 5 is a view partly in section showing the embodiment of FIG. 4.

FIG. 4 is a perspective view showing a modification of the projecting lens unit 50 illustrated in FIG. 3. The modified parts are designated by reference numerals over 100 and will be described below, while the same parts as in FIG. 3 are indicated by the same reference numerals and will not be described.

A lens changing lever 101, which is substantially T-shaped, is supported by an intermediate plate 103 and slidable in the direction of an arrow D. The intermediate plate 103 is fixed to the support plate 80. The upper bar portion 102 of the T-shaped lever 101 is formed at its opposite ends with slots 102′, in which pins 104 and 105 fixed to the plate 103 are inserted respectively, while a pin 107 fixed to the lever 101 extends through a slot 103' formed in the intermediate plate 103. A spring 108 extending from the pin 107 to a pin 106 on the intermediate plate 103 biases the lens changing lever 101 toward the direction opposite to arrow D at all times.

A pin 109 projects downward from the lever 101 and is held by the action of the spring 108 in contact with one side of a lever positioning plate 110 attached to the main body and having recesses 111 and 112 in that side. The lever 101 is held in position with respect to the direction of the arrow D and relative to the intermediate plate 103, by the contact between the pin 109 and the plate 110. The recesses 111 and 112 are so located that the pin 109 is engageable therein when the first and second projecting lenses 40a and 40b are in the projecting position respectively.

The upper bar portion 102 of the T-shaped lever 101 is provided with a bent portion (see FIG. 5) for contact with the dial shaft 65. When the lever 101 is moved in the direction of the arrow D, the bent portion moves the dial shaft 65 in the direction opposite to the arrow A shown, consequently bringing the focusing dial 64 out of engagement with the focusing ring 41a or 41b of the lens. While the pin 109 is in engagement with the side recessed portion 111 or 112 of the positioning plate 110, the focusing dial 64 is in engagement with the focusing ring 41a or 41b on the corresponding lens.

Briefly this embodiment operates in the following manner when shifting the second projecting lens 40b in the position of FIG. 4 to the projecting position. The reverse lens changing procedure will not be described.

The operator holds the lens changing lever 101 and moves the lever in the direction of the arrow D. This movement shifts the focusing dial 64 in the direction opposite to arrow A out of engagement with the focusing ring 41a of the lens 40a, thus shifting the dial 64 to a non-operating position. At the same time, the pin 109 moves out of the side recess 111 of the positioning plate 110 to render the changing lever 101 movable in the direction of an arrow E in FIG. 4.

When the lever 101 is moved in the direction of the arrow E, the support plate 80 also moves with the lever 101, bringing the lens 40b to the projecting position. The pin 109 which opposes the side recess 112 of the positioning plate 110 at this time engages in the recess 112, with the result that the dial 64 which has been in its nonoperating position shifts to the operating position into engagement with the focusing ring 41b of the lens 40b. Consequently the lens 40b can be focused by the focusing dial 64. The pin 109 and the recess 112 provide a click stop to hold the projecting lens 40b in the projecting position.

Although the present invention has been fully described by way of example with reference to the accompanying drawings, it is to be noted that various changes and modifications will be apparent to those skilled in the art. Therefore, unless otherwise such changes and modifications depart from the scope of the present invention, they should be construed as included therein.

For instance, whereas the embodiments of the focus adjusting mechanism of this invention described are adapted for use in a variable magnification device employing two lenses, the invention is similarly useful for variable magnification devices in which more than two lenses are used.

What is claimed is:

1. A focus adjusting mechanism for use with variable magnification means comprising a support member fixedly supporting a plurality of projecting lenses and movable for selectively bringing one of the projecting lenses to a projecting position, focus adjusting first means shiftable between an operating position and a nonoperating position, second means biasing the focus adjusting first means toward the operating position for rendering a projecting lens adjustable by the focus adjusting first means when the lens is positioned in the projecting position, and third means for shifting the focus adjusting means against the action of the second means to the nonoperating position to permit changing the lenses.

2. The focus adjusting mechanism as claimed in claim 1, further comprising a lever coupled to said support member for moving the support member, said lever being shiftable relative to the support member between a first position and a second position.

3. The focus adjusting mechanism as claimed in claim 2, wherein said third means is connected by coupling means to said lever and is movable by the shift of the lever to the second position to shift the focus adjusting means.

4. The focus adjusting mechanism as claimed in claim 3, wherein the shift of the lever to the second position renders the support member movable by the lever.

5. The focus adjusting mechanism as claimed in claim 4, further comprising means for biasing the lever toward the first position.

6. A focus adjusting mechanism operable for causing focusing adjustment of a plurality of magnification projecting lenses having different focal lengths comprising movably mounted supporting means for fixedly carrying said plurality of projecting lenses, means coupled to said supporting means for causing movement thereof so that one of said projecting lenses will be brought to an operative projecting position, adjustment means mounted for movement between an operating position for causing focusing adjustment of the projecting lens in the operative projecting position and a nonoperating position, means connected with said adjustment means for biasing said adjustment means toward the operating position, and means for moving said adjustment means to the nonoperating position, whereby said supporting means can be moved to selectively change projecting lenses in the operative projecting position without said adjustment means effecting focus adjustment of said lenses.

7. The focus adjustment mechanism according to claim 6 wherein said means for moving said adjustment means to the nonoperating position is coupled with said means coupled to the supporting means so that upon movement of said supporting means said adjustment means will be moved to the nonoperating position.

8. The focus adjusting mechanism according to claim 6 further comprising means for causing said supporting means to move in one of two opposite directions along a line for moving a selected projecting lens to an operative projecting position, and wherein said means for moving said adjustment means to the nonoperating position thereof causes said adjusting means to be moved in a direction substantially transverse to the line of movement of said supporting means.

9. The focus adjusting mechanism according to claim 6 further comprising means for holding said supporting means in a selected position.

10. The focus adjusting mechanism according to claim 6 wherein said adjustment means is carried for pivotal movement between said operating and nonoperating positions, and further comprising means for limiting pivotal movement of said adjustment means when said adjusting means is moved to the operating position.

* * * * *